United States Patent
Hanafusa et al.

[11] Patent Number: 5,865,027
[45] Date of Patent: Feb. 2, 1999

[54] DEVICE FOR DETERMINING THE ABNORMAL DEGREE OF DETERIORATION OF A CATALYST

[75] Inventors: Toru Hanafusa, Susono; Michihiro Ohashi, Mishima, both of Japan

[73] Assignee: Toyota Jidosha Kabushiki Kaisha, Aichi, Japan

[21] Appl. No.: 62,449

[22] Filed: Apr. 17, 1998

Related U.S. Application Data

[62] Division of Ser. No. 632,375, Apr. 10, 1996, Pat. No. 5,765,370.

[30] Foreign Application Priority Data

Apr. 12, 1995 [JP] Japan .................................. 7-86981
Jul. 24, 1995 [JP] Japan ................................ 7-187045

[51] Int. Cl.⁶ .................................................. F01N 3/00
[52] U.S. Cl. .................................... 60/277; 60/276
[58] Field of Search .................... 60/274, 276, 277

[56] References Cited

U.S. PATENT DOCUMENTS

| | | | |
|---|---|---|---|
| 5,077,970 | 1/1992 | Hamburg | 60/277 X |
| 5,386,693 | 2/1995 | Orzel | 60/277 X |
| 5,400,592 | 3/1995 | Mukaihira et al. | 60/277 X |
| 5,524,433 | 6/1996 | Adamczyk, Jr. et al. | 60/277 X |
| 5,531,069 | 7/1996 | Katsuhiko | 60/277 X |
| 5,591,905 | 1/1997 | Fujimoto et al. | 60/277 X |
| 5,647,204 | 7/1997 | Atanasyan | 60/277 X |

Primary Examiner—John E. Ryznic
Attorney, Agent, or Firm—Kenyon & Kenyon

[57] ABSTRACT

A device for determining the abnormal degree of deterioration of a catalyst of a catalytic converter arranged in an internal combustion engine exhaust system is disclosed. The device includes first and second air-fuel ratio sensors located upstream and downstream of the catalyst. The device determines a first purification ability based on readings of the sensors during a warmup stage of the catalyst, and a second purification ability after the warmup is completed. An overall purification ability of the catalyst is determined by combining the purification ability of the catalyst during warmup and the purification ability of the catalyst after warmup, where the weight of the purification ability during warmup is less than the purification ability after warmup in the overall purification ability. If the overall purification ability of the catalyst is less than a certain amount, then the device determines that the catalyst has deteriorated.

5 Claims, 20 Drawing Sheets

DEVICE FOR DETERMINING THE ABNORMAL DEGREE OF DETERIORATION OF A CATALYST

This application is a division of prior application Ser. No. 08/632,375, filed Apr. 10, 1996 now U.S. Pat. No. 5,765,370.

BACKGROUND OF THE INVENTION

1. Field of the Invention

The present invention relates to a device for determining the abnormal degree of deterioration of a catalyst.

2. Description of the Related Art

A catalyst is usually arranged in an exhaust passage to purify the exhaust gas. Once the catalyst deteriorates excessively, the catalyst cannot purify the exhaust gas sufficiently. Accordingly, it is necessary to determine the abnormal degree of deterioration of the catalyst, to inform the driver about this, and to urge the driver to exchange the catalyst for a new one.

The exchange is costly and requires much time. Accordingly, it is necessary to determine the abnormal degree of deterioration of a catalyst precisely. In a usual device for determining the abnormal degree of deterioration of a catalyst, the current purification ability of a catalyst is detected after the catalyst has been activated and, thereafter, the current purification ability is compared with the threshold which corresponds to the abnormal degree of deterioration thereof. In a catalyst, only a purification ability before the catalyst has been activated can drop excessively. In this case, the usual device determines that the degree of deterioration of the catalyst is normal. Therefore, the catalyst is not exchanged and thus the exhaust gas is not completely purified before it has been activated.

To solve this problem, Japanese Unexamined Patent Publication No. 5-248227 discloses a device for determining the abnormal degree of deterioration of a catalyst. The device corrects the threshold which corresponds to the abnormal degree of deterioration of a catalyst, according to the degree of activation thereof, i.e., the temperature thereof, detects a current purification ability thereof before and after the catalyst has been activated, compares the current purification ability with the corrected threshold, and determines if the degree of deterioration thereof is abnormal.

However, a purification ability of a catalyst before the catalyst has been activated is particularly unstable, because it varies largely according to not only the temperature thereof but also the harmful materials content of the exhaust gas and the like. Accordingly, if the device merely compares the current purification ability with the corrected threshold and determines the degree of deterioration of the catalyst, the device can mistake the determination.

SUMMARY OF THE INVENTION

Therefore, an object of the present invention is to provide a device for determining the abnormal degree of deterioration of a catalyst and capable of determining accurately if the degree of deterioration thereof is abnormal.

According to the present invention, there is provided a device for determining the abnormal degree of deterioration of catalyst of a catalytic converter arranged in an internal combustion engine exhaust system, comprising: purification ability grasping means for grasping a current purification ability of the catalyst; temperature grasping means for grasping a current temperature of the catalyst; threshold determining means for determining a threshold of the purification ability which corresponds to the abnormal degree of deterioration of the catalyst, in accordance with the current temperature of the catalyst; appraisal value determining means for determining an appraisal value, in accordance with a difference between the threshold and the current purification ability; integration value calculating means for calculating an integration value of the appraisal value; and abnormality determining means for determining that the degree of deterioration of the catalyst is abnormal when the integration value exceeds a predetermined value.

According to the present invention, there is provided another device for determining the abnormal degree of deterioration of catalyst of a catalytic converter arranged in an internal combustion engine exhaust system, comprising: first purification ability grasping means for grasping a first purification ability of the catalyst in the complete activation condition of said catalyst; second purification ability grasping means for grasping a second purification ability of the catalyst in an incomplete activation condition of said catalyst; overall purification ability calculating means for calculating an overall purification ability of the catalyst such that the first purification ability given a first weight is added to the second purification ability given a second weight which is less than the first weight; and abnormal determining means for determining if the degree of deterioration of the catalyst is abnormal by the comparison between the overall purification ability and a predetermined threshold thereof.

According to the present invention, there is provided a further another device for determining the abnormal degree of deterioration of catalyst of a catalytic converter arranged in an internal combustion engine exhaust system, comprising: first purification ability grasping means for grasping a first purification ability of the catalyst in complete activation condition of said catalyst; a second purification ability grasping means for grasping a second purification ability of the catalyst in incomplete activation condition of the catalyst; first provisional determining means for determining provisionality if the degree of deterioration of the catalyst is abnormal by the comparison between the first purification ability and a first predetermined threshold thereof; second provisional determining means for determining provisionality if the degree of deterioration of the catalyst is abnormal by the comparison between the second purification ability and a second predetermined threshold thereof; and main determining means for determining if the degree of deterioration of the catalyst is abnormal by the results of the first and second provisional determining means.

The present invention will be more fully understood from the description of preferred embodiments of the invention set forth below, together with the accompanying drawings.

DESCRIPTION OF THE PREFERRED EMBODIMENTS

Figure 1:
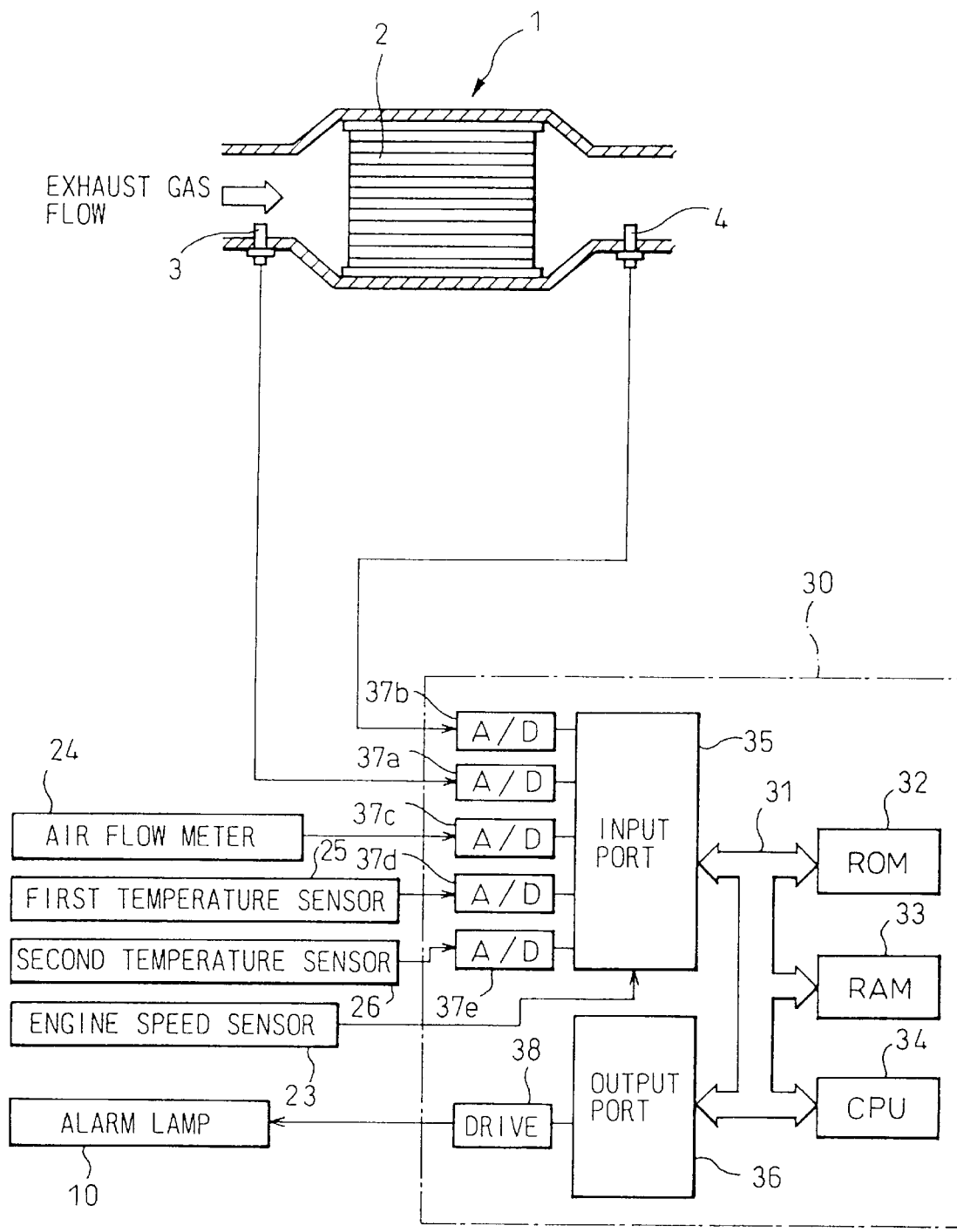
FIG. 1 is a section view of a part of an internal combustion engine exhaust system with a device for determining the abnormal degree of deterioration of a catalyst.

FIG. 1 is a sectional view of a part of an internal combustion engine exhaust system with a device for determining the abnormal degree of deterioration of a catalyst according to the present invention. Referring to FIG. 1, reference numeral 1 designates a three-way catalytic converter which purifies the exhaust gas. The three-way catalytic converter has an $O_2$ storage ability such that it absorbs and stores excess oxygen existing in the exhaust gas when the air-fuel ratio in the exhaust gas is on the lean side, and it releases oxygen when the air-fuel ratio in the exhaust gas is on the rich side. Therefore, the air-fuel ratio in the exhaust gas becomes almost stoichiometric so that the three-way catalytic converter 1 can purify the exhaust gas sufficiently. The upstream side of the three-way catalytic converter 1 is connected to the engine body (not shown). On the other hand, the downstream side thereof is opened to the atmosphere, via a muffler (not shown). Reference numeral 2 designates a catalytic carrier which carries the catalyst. Reference numeral 3 designates a first air-fuel ratio sensor which detects an air-fuel ratio in the exhaust gas flowing into the catalytic carrier 2. Reference numeral 4 designates a second air-fuel ratio sensor which detects an air-fuel ratio in the exhaust gas flowing out from the catalytic carrier 2. The first and second air-fuel ratio sensors 3, 4 produce an output voltage which is proportional to the air-fuel ratio in the exhaust gas.

The three-way catalytic converter 1 gradually deteriorates with the use thereof. Once the degree of deterioration of the three-way catalytic converter 1 becomes abnormal, the purification ability thereof becomes very low so that the exchange thereof is necessary. Reference numeral 30 is a device which determines the time of such exchange, i.e., the abnormal degree of deterioration of the catalyst.

The device 30 is an electronic control unit (ECU). The ECU 30 is constructed as a digital computer and includes a ROM (read only memory) 32, a RAM (random access memory) 33, a CPU (microprocessor, etc.) 34, an input port 35, and an output port 36, which are interconnected by a bidirectional bus 31. The output voltages of the first and second air-fuel ratio sensors 3, 4 are input into the input port 35 via an AD converters 37a, 37b, respectively. An engine speed sensor 23, which produces an output pulse representing the engine speed, is connected to the input port 35. An air flow meter 24 produces an output voltage which is proportional to the amount of air fed into the engine cylinder, and this output voltage is input into the input port 35 via an AD converter 37c. A first temperature sensor 25 produces an output voltage which is proportional to the temperature of the engine cooling water, and this output voltage is input into the input port 35 via an AD converter 37d. A second temperature sensor 26 produces an output voltage which is proportional to the temperature of the atmosphere, and this output voltage is input into the input port 35 via an AD converter 37e. The output port 36 is connected through a drive circuit 38 to an alarm lamp 10 showing that the degree of deterioration of the three-way catalytic converter 1 becomes abnormal. In the engine, an amount of injected fuel is controlled such that an air-fuel ratio in the mixture becomes almost stoichiometric by means of the first and second air-fuel ratio sensors 3, 4. The fuel injection control is a conventional air-fuel ratio feed-back control.

Figure 2:
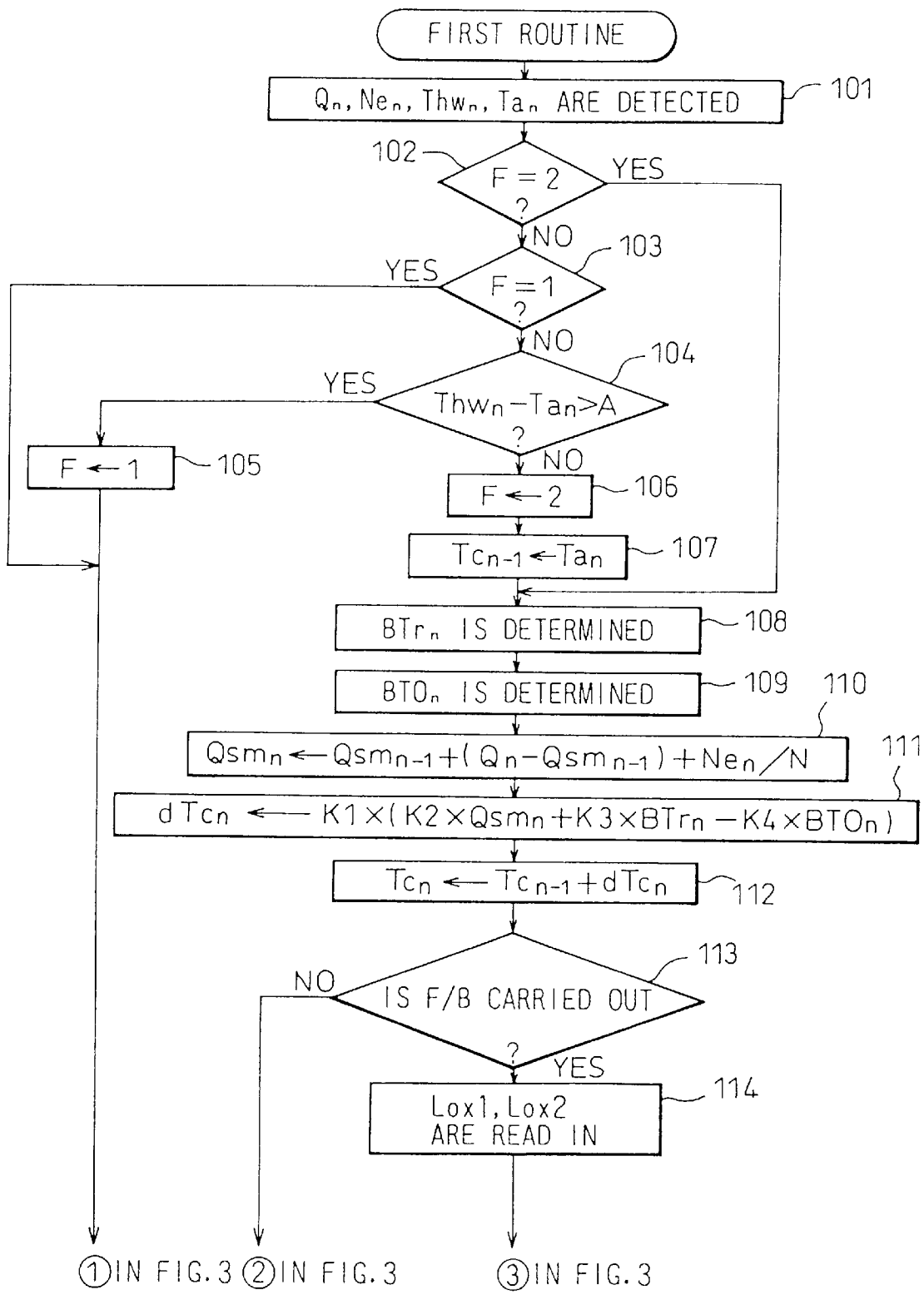
FIG. 2 is a part of a first routine for determining the abnormal degree of deterioration of a catalyst.
Figure 3:
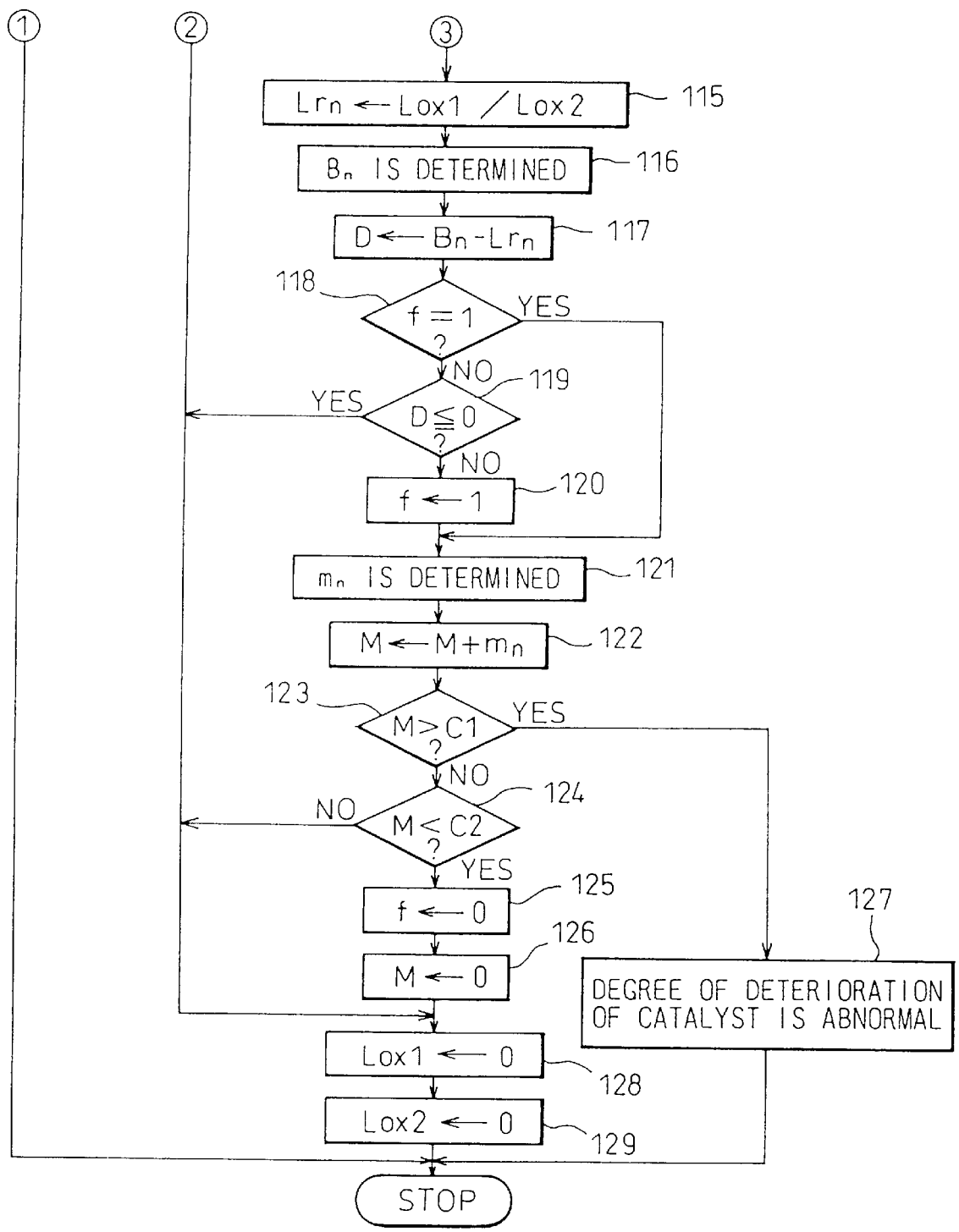
FIG. 3 is the remainder of the first routine.

FIGS. 2 and 3 show a first routine for determining the abnormal degree of deterioration of the three-way catalytic converter 1. The first routine is started simultaneously with the engine starting and is repeated at every predetermined period. First, at step 101, a current amount of intake air $[Q_n]$, a current engine speed $[Ne_n]$, a current temperature of the engine cooling water $[Thw_n]$, and a current temperature of the atmosphere $[Ta_n]$ are detected by the above-mentioned sensors. Next, at step 102, it is determined if a flag [F] is [2]. The flag [F] is reset to [0] when the engine is stopped. Accordingly, the result at step 102 is negative and the routine goes to step 103. At step 103, it is determined if a flag [F] is [1]. The result is negative similarly and the routine goes to step 104.

At step 104, it is determined if a difference between the temperature of the engine cooling water $[Thw_n]$ and the temperature of the atmosphere $[Ta_n]$ is larger than a predetermined value [A]. When the result is affirmative, the engine has been started again immediately after it was stopped so that the routine goes to step 105 and the flag [F] is made [1] and the routine is stopped. On the other hand, when the result at step 104 is negative, the routine goes to step 106 and the flag [F] is made [2]. Thereafter, the routine goes to step 107.

Figure 4:
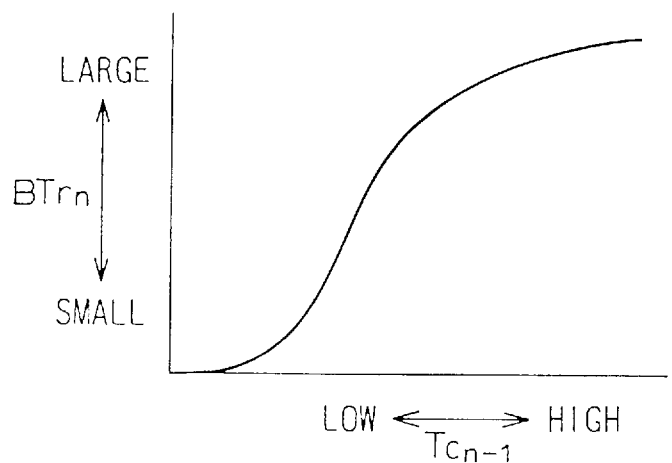
FIG. 4 is a map for determining an amount of basic reaction heat used in the first routine.

At step 107, the temperature of the atmosphere $[Ta_n]$ is made an assumed temperature of the catalyst at the last time $[Tc_{n-1}]$. At step 108, an amount of basic reaction heat $[BTr_n]$ at this time is determined by a map shown in FIG. 4, on the basis of the assumed temperature of the catalyst at least time $[Tc_{n-1}]$. An amount of basic reaction heat is an amount of heat which is generated by the purification of the exhaust gas in a current temperature of the catalyst, i.e., a current degree of activation of the catalyst. Accordingly, the higher the temperature of the catalyst becomes, the larger an amount of basic reaction heat is set on the map shown in FIG. 4. The amount of basic reaction heat varies according to not only the temperature of the catalyst, but also the current purification ability of the catalyst. Accordingly, a similar map is provided in every purification ability of the catalyst and a map used at step 108 is selected from these maps on the basis of the purification ability at the last time $[Lr_{n-1}]$ which is explained below in detail.

Figure 5:
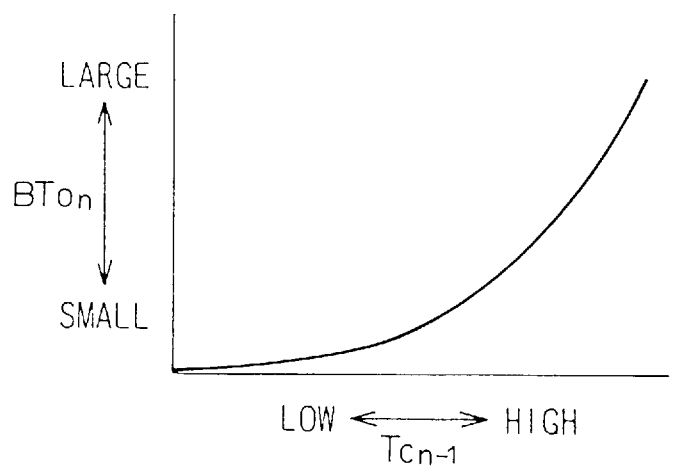
FIG. 5 is a map for determining an amount of basic radiation heat used in the first routine.

Next, at step 109, an amount of basic radiation heat at this time $[BTo_n]$ is determined by a map shown in FIG. 5, on the basis of the assumed temperature of the catalyst at the last time $[Tc_{n-1}]$. The amount of basic radiation heat is an amount of heat which radiates from the catalyst. Accordingly, the higher the temperature of the catalyst becomes, the larger an amount of basic radiation heat is set on the map shown in FIG. 5.

At step 110, an amount of exhaust gas flowing into the catalytic carrier 2 is calculated by an expression (1), as an amount of calculated intake air $[Qsm_n]$.

$$Qsm_n = Qsm_{n-1} + (Q_n - Qsm_{n-1}) * Ne_n / N \quad (1)$$

The expression (1) represents smoothing process of an amount of intake air. In the expression (1), $[Q_n]$ is an amount of measured intake air at this time. $[Qsm_{n-1}]$ is an amount of calculated intake air at the last time and is set as the usual amount of idle intake air, as an initial value immediately after the engine is started. Of course, the initial value can take account of the variation of idle intake air according to the temperature of the engine cooling water [Thw]. $[Ne_n]$ is the engine speed. [N] is a predetermined value. The premise of expression (1) is that the lower the current engine speed is, the smaller the absolute value of the varying amount of intake air is.

Next, the routine goes to step 111 and a varying value of the temperature of the catalyst at this time $[dTc_n]$ is calculated by an expression (2).

$$dTc_n = K1 * (K2 * Qsm_n + K3 * BTr_n - K4 * BTo_n) \quad (2)$$

In the expression (2), a second correction coefficient [K2] is used to convert the amount of calculated intake air $[Qsm_n]$ as the amount of exhaust gas flowing into the catalytic carrier into an amount of heat given to the catalyst by the exhaust gas at this time. The coefficient [K2] takes account of the temperature of the exhaust gas assumed on the basis of a current engine operating condition determined by a current amount of intake air $[Q_n]$, a current engine speed $[Ne_n]$, a current temperature of the engine cooling water $[Thw_n]$, and the like. A third correction coefficient [K3] converts the amount of basic reaction heat $[BTr_n]$ at this time which takes account of the degree of activation of the catalyst into an amount of actual reaction heat. The coefficient [K3] takes account of the amount of exhaust gas and the air-fuel ratio determined on the basis of the current engine operating condition. A fourth correction coefficient [K4] converts the amount of basic radiation heat $[BTo_n]$ at this time which takes account of the temperature of the catalyst into an amount of actual radiation heat. The coefficient [K4] takes account of the temperature of the atmosphere $[Ta_n]$ and the amount of exhaust gas. Thus, the second coefficient [K2], the third coefficient [K3], and the fourth coefficient [K4] are again determined by the use of maps (not shown) when the process at step 111 is repeated. On the other hand, a first correction coefficient [K1] converts an amount of heat which increases of decrease in such manner in the catalyst into an average varying value of the temperature in each portion of the catalytic carrier 2.

Next, the routine goes to step 112 and an assumed temperature of the catalyst at this time $[Tc_n]$ is calculated in a manner that the average varying value of the temperature of the catalyst $[dTc_n]$ is added to the assumed temperature of the catalyst at the last time $[Tc_{n-1}]$. Next, at step 113, it is determined if the above mentioned air-fuel ratio feed-back control [F/B] is carried out. When the result is affirmative, the routine goes to step 114, and a first integration value [Lox1] of output local length of the first air-fuel ratio sensor 3 and a second integration value [Lox2] of output local length of the second air-fuel ratio sensor 4 are read in from a routine shown in FIG. 6. On the other hand, when the result at step 113 is negative, for example, in the case that a fuel-cut is carried out during a deceleration of the engine, the routine goes to steps 128, and the first integration value [Lox1] is reset to [0] in the present routine and in the routine shown in FIG. 6. Next, at step 129, the second integration value [Lox2] is reset to [0] in the present routine and in the routine shown in FIG. 6. Next, the routine is stopped.

Figure 6:
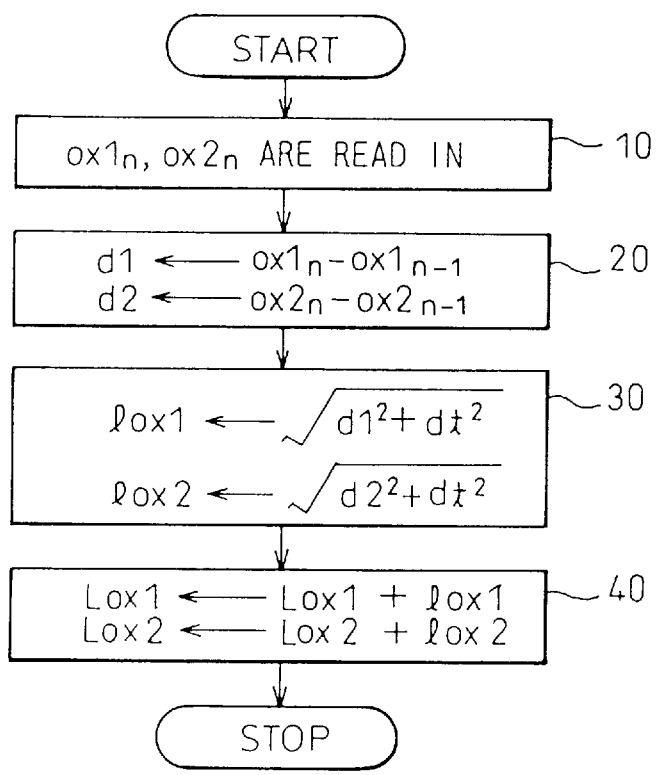
FIG. 6 is a routine for calculating a first and second integration value used in the first routine.

Here, the routine shown in FIG. 6 is explained as follows. The routine is started simultaneously with the engine starting and is repeated at every predetermined period [dt] which is between one-tenth and one-thousandth of the repeating period of the first routine. Initially, at step 10, an output $[ox1_n]$ of the first air-fuel ratio sensor 3 at this time and an output $[ox2_n]$ of the second air-fuel ratio sensor 4 at this time are read in. At step 20, a difference [d1] between the output $[ox1_n]$ at this time and the output $[ox1_{n-1}]$ at the last time of the first air-fuel ratio sensor 3, and a difference [d2] between the output $[ox2_n]$ at this time and the output $[ox2_{n-1}]$ at last time of the second air-fuel ratio sensor 4 are calculated.

Next, the routine goes to step 30, and the first output local length [lox1] of the first air-fuel ratio sensor 3 and the second output local length [lox2] of the second air-fuel ratio sensor 4 are calculated by expressions (3) and (4).

$$lox1 = (d1^2 + dt^2)^{0.5} \quad (3)$$

$$lox2 = (d2^2 + dt^2)^{0.5} \quad (4)$$

Next, at step 40, as shown in expressions (5) and (6), the first output local length [lox1] and the second output local length [lox2] are integrated respectively after previous integration values had been reset to [0], and thus the first integration value [Lox1] and the second integration value [Lox2] are calculated. Thereafter, the routine is stopped.

$$Lox1 = Lox1 + lox1 \quad (5)$$

$$Lox2 = Lox2 + lox2 \quad (6)$$

Returning to the first routine. After the first and second integration values [Lox1] and [Lox2], which are calculated in such manner, are read in, the routine goes to step 115 and a ratio $[Lr_n]$ of the first integration value [Lox1] to the second integration value [Lox2] is calculated. The $O_2$ storage ability of the three-way catalytic converter 1 drops according to the deterioration of the catalyst so that a current $O_2$ storage ability is almost equivalent to a current purification ability of the catalyst. When the $O_2$ storage ability does not drop, the air-fuel ratio in exhaust gas downstream the catalyst becomes almost stoichiometric so that the second integration value [Lox2] becomes a minimum and thus the ratio $[Lr_n]$ becomes large. Conversely, when the $O_2$ storage ability is completely lost, the excess or deficiency of oxygen in the exhaust gas is not completely compensated so that the output of the second air-fuel ratio sensor 4 varies the almost same as the first air-fuel ratio sensor 3, and thus the second integration value [Lox2] becomes a maximum. Therefore, the ratio [$Lr_n$] becomes [1]. Accordingly, the ratio [$Lr_n$] becomes equivalent to a current purification ability of the catalyst.

Figure 7:
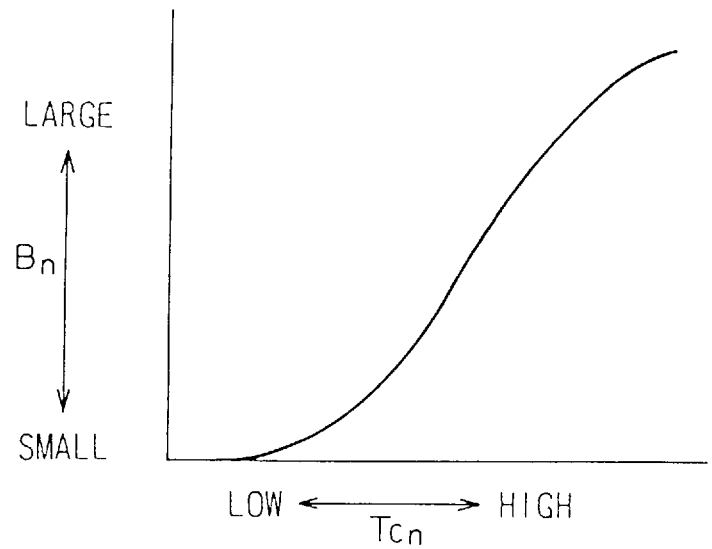
FIG. 7 is a map for determining a threshold used in the first routine.

Next, the routine goes to step 116, and a threshold [$B_n$] of the purification ability which corresponds the abnormal degree of deterioration of the catalyst in the current catalyst temperature is determined from a map shown in FIG. 7, on the basis of the assumed temperature of the catalyst [$Tc_n$] at step 112.

The routine goes to step 117, and a difference [D] between the threshold [$B_n$] determined at step 116 and the current purification ability of the catalyst determined at step 115 is calculated and the routine goes to step 118. At step 118, it is determined if a flag [f] is [1]. The flag [f] is also reset to [0] when the engine is stopped and when the routine goes to step 125. Accordingly, the routine goes to step 119 and it is determined if the difference [D] is equal to or smaller than [0]. When the result is affirmative, it is determined that the degree of deterioration of the catalyst is normal. Next, at step 128, the first integration value [Lox1] is reset to [0]. At step 129, the second integration value [Lox2] is reset to [0]. The routine is stopped.

On the other hand, when the result at step 119 is negative, the degree of deterioration of the catalyst may reach an abnormal area. The routine goes to step 120 and the flag [f] is made [1]. Next, at step 121, an appraisal value at this time [$m_n$] is determined by a map shown in FIG. 8, on the basis of the difference [D]. In the map, an appraisal value is set such that the larger the difference [D] becomes, the larger the appraisal value is.

Next, at step 122, an integration value [M] of the appraisal value [$m_n$] is calculated. The integration value [M] is reset to [0] when the engine is stopped and when the routine goes to step 126. Thereafter, the routine goes to step 123, and it is determined if the integration value [M] becomes larger than a predetermined plus value [C1]. When the result is negative, the routine goes to step 124 and it is determined if the integration value [M] has become smaller than a predetermined minus value [C2]. When the result is negative, the routine goes to step 128 and the first integration value [Lox1] is reset to [0]. Next, at step 129, the second integration value [Lox2] is reset to [0]. The routine is stopped.

When the flag [f] is made [1], in the next process through the routine, the result at step 118 is negative and thus the process after step 121 is repeated. If during the process, the difference [D] calculated at step 117 is kept to become plus, i.e., the purification ability [$Lr_n$] calculated at step 115 is kept to be smaller than the threshold [$B_n$] determined at step 116, the integration value [M] becomes large. Therefore, the result at step 123 is affirmative and at step 127, it is determined that the degree of deterioration of the catalyst is abnormal and this is informed to the driver by an alarm lamp 10.

The appraisal value [$m_n$] becomes minus when the difference [D] becomes minus, i.e., when the purification ability [$Lr_n$] is larger than the threshold [$B_n$]. Accordingly, in case that the purification ability [$Lr_n$] is temporarily less than the threshold [$B_n$] in spite of the normal degree of deterioration of the catalyst, the integration value [M] becomes small while the process after step 121 is repeated. Therefore, the result at step 124 is negative and the routine goes to step 125 and the flag [f] is reset to [0]. At step 126, the integration value [M] is reset to [0]. At step 128, the first integration value [Lox1] is reset to [0]. At step 129, the second integration value [Lox2] is reset to [0]. The routine is stopped.

The premise of the present routine is that when the engine is started, the temperature of the catalyst is nearly equal to the temperature of the atmosphere [Ta], and assumes the temperature of the catalyst [Tc]. Accordingly, when the result at step 104 is affirmative, i.e., when the engine is started again immediately after it was stopped, the flag [F] is made [1] and thereafter the result at step 103 remains affirmative and thus the routine is stopped without determining the degree of deterioration of the catalyst. If the result at step 104 is negative when the engine is started, the flag [F] is made [2] and thereafter the result at step 102 remains affirmative and thus the process after step 108 is repeated.

Thus, according to the present routine, it is also determined if the degree of deterioration of the catalyst is abnormal before the catalyst has been completely activated. Therefore, in case that the purification ability of the catalyst drops excessively only before it has been completely activated, it is also determined if the degree of deterioration of the catalyst is abnormal. Accordingly, in this case, the driver can be urged to exchange the catalyst for a new one and thus it is prevented that the exhaust gas is not purified sufficiently before the catalyst has been completely activated. In the determination, an assumed current purification ability is compared with a threshold according to the temperature of the catalyst. In particular, a purification ability before the catalyst has been completely activated is unstable, because it varies largely according to not only the temperature thereof but also the harmful material content of the exhaust gas and the like. Accordingly, the above mentioned comparison of only one time can make a mistake in the determination. However, according to the present routine, when the degree of deterioration of the catalyst may be abnormal, the appraisal value is determined every comparison, and it is determined that the degree of deterioration of the catalyst is abnormal when the integration value of the appraisal valuefication exceeds the predetermined value, so that the reliability of determination can be improved considerably.

Figure 8:
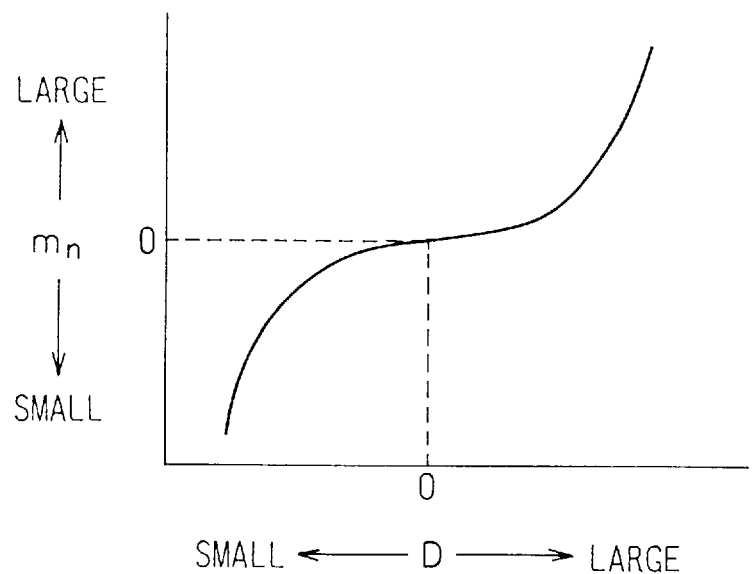
FIG. 8 is a map for determining an appraisal value used in the first routine.
Figure 9:
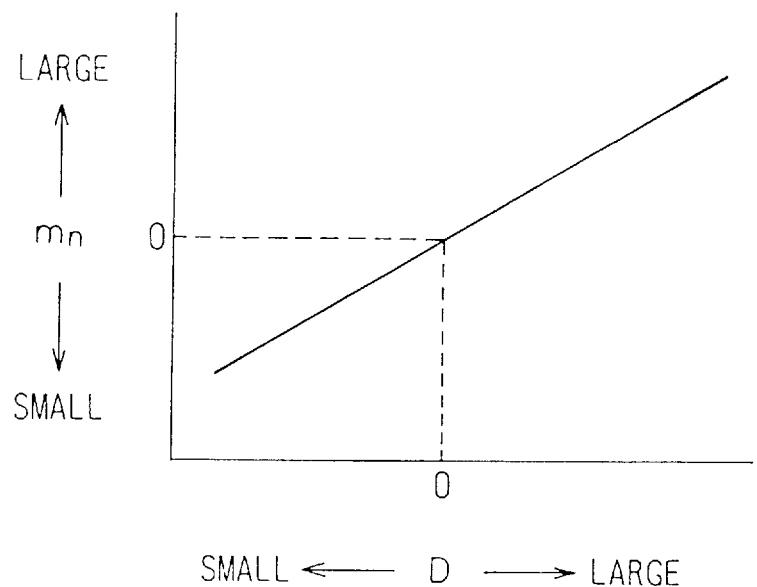
FIG. 9 is another map for determining an appraisal value used in the first routine.

According to the present routine, in the map for determining an appraisal value shown in FIG. 8, an appraisal value [m] is set such that the larger the difference [D] becomes, the very much larger [m] becomes. However, this does not limit the present invention. An appraisal value [m] may be set such the integration value [M] becomes large at least when the difference [D] becomes positive, for example, such that it is direct proportion to the difference [D] as shown in FIG. 9. According to the present routine, a threshold is determined at step 116, on the basis of the current temperature of the catalyst, and a difference between the threshold and the current purification ability is calculated at step 117, and an appraisal value is determined at step 121 on the basis of the difference. Of course, according to this idea, an appraisal value is preset in a map shown in FIG. 13, in accordance with a temperature of the catalyst and a purification ability thereof, and thus steps 116 and 117 are eliminated and at step 121 an appraisal value may be determined by this map.

Figure 10:
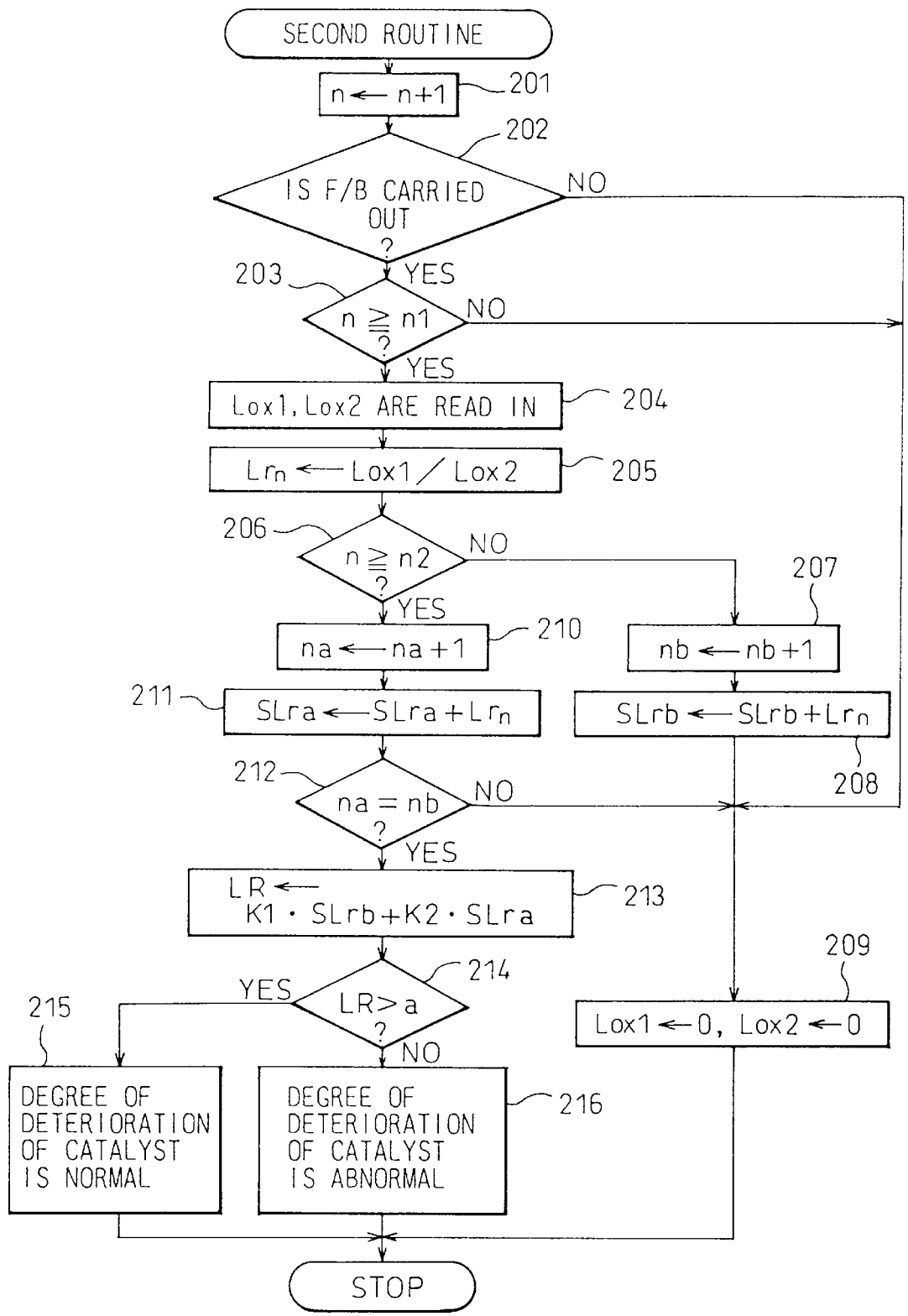
FIG. 10 is a second routine for determining the abnormal degree of deterioration of a catalyst.

FIG. 10 shows a second routine for determining the abnormal degree of deterioration of the catalyst. The routine is started simultaneously with the engine starting and is repeated at every predetermined period. First, at step 201, a count value [n] is increased by [1], which value is reset to [0] when the engine is stopped. Next, the routine goes to step 202 and it is determined if the above mentioned air-fuel ratio feed-back control [F/B] is carried out. When the result is negative, for example, in the case that a fuel-cut is carried out in a deceleration of the engine, the routine goes to step 209 and the first and second integration value [Lox1], [Lox2] are reset to [0] in the present routine and in the routine shown in FIG. 6 since a current purification ability of the catalyst can not be determined by the first and second air-fuel ratio sensors 3, 4, as mentioned above. Next, the routine is stopped.

When the result at step 202 is affirmative, the routine goes to step 203 and it is determined if the count value [n] is equal to or larger than a first predetermined value [n1]. When the result is negative, i.e., immediately after the engine is started, the routine goes to step 209 and the first and second integration value [Lox1], [Lox2] are reset to [0] in the present routine and in the routine shown in FIG. 6. Next, the routine is stopped.

When the result at step 203 is affirmative, i.e., when a predetermined period lapsed after the engine had been started so that the catalyst is during or after the warming-up thereof, the routine goes to step 204 and the first and second integration values [Lox1], [Lox2] calculated in the routine shown in FIG. 6 are read in. Next, at step 205, a current purification ability [Lr$_n$] is calculated as explained in the first routine.

Next, the routine goes to step 206 and it is determined if the count value [n] is equal to or larger than a second predetermined value [n2]. The result is negative immediately after the count value [n] has exceeded the first predetermined value [n1], and thus the routine goes to step 207 and another count value [nb] is increased by [1], which value is reset to [0] when the engine is stopped. Next, at step 208, an integration value [SLrb] of the purification ability [Lr$_n$] when the count value [n] is between the first and second predetermined values [n1], [n2] is calculated. Next, the above-mentioned process at step 209 is carried out and the routine is stopped.

Once such a process is repeated, the count value [n] becomes larger than the second predetermined value [n2], i.e., a period lapsed after the engine starting is increased and the catalyst has been completely warmed up. At this time, the result at step 206 is affirmative and the routine goes to step 210. At step 210, a further another count value [na] is increased by [1]. At step 211, an integration value [SLra] of the purification ability [Lr$_n$] when the count value [n] is larger than the second predetermined value [n2] is calculated.

Next, the routine goes to step 212 and it is determined if the count value [na] is equal to the count value [nb] increased at step 207. The determination means that if an integration times of the purification ability after the catalyst has been completely warmed up, i.e., in a complete activation condition, becomes equal to the integration times of the purification ability while the catalyst is warmed up, i.e., in an incomplete activation condition. When the result is negative, the above-mentioned process at step 209 is carried out and the routine is stopped.

When the result at step 212 is affirmative, the routine goes to step 213 and the integration value [SLrb] is multiplied by a first coefficient [k1], the integration value [SLra] is multiplied by a second coefficient [k2], and the sum of these multiplied values is made an overall purification ability of the catalyst [LR]. Here, the first coefficient [k1] is smaller than the second coefficient [k2].

Next, the routine goes to step 214 and it is determined if the overall purification ability [LR] is larger than a threshold [a] thereof which corresponds to the abnormal degree of deterioration of the catalyst. When the result is affirmative, the routine goes to step 215 and it is determined that the degree of deterioration of the catalyst is normal. On the other hand, when the result at step 214 is negative, the routine goes to step 216 and it is determined that the degree of deterioration of the catalyst is abnormal.

Thus, according to the present routine, the overall purification ability [LR] is determined to treat the integration value of the purification ability in an incomplete activation condition of the catalyst lightly and one in a complete activation condition thereof heavily, by the first and second coefficients [k1], [k2]. Because, the integration value of the purification ability in an incomplete activation condition of the catalyst is unstable, and one in a complete activation condition thereof is stable and reliable. The overall purification ability [LR] represents an actual purification ability accurately and takes account of the purification ability in an incomplete activation condition of the catalyst. Therefore, if the overall purification ability is used in the determination of the abnormal degree of deterioration of the catalyst, the determination can be made accurate in case of the usual deterioration of the catalyst and in the case that the purification ability of the catalyst drops only in incomplete activation condition.

Figure 11:
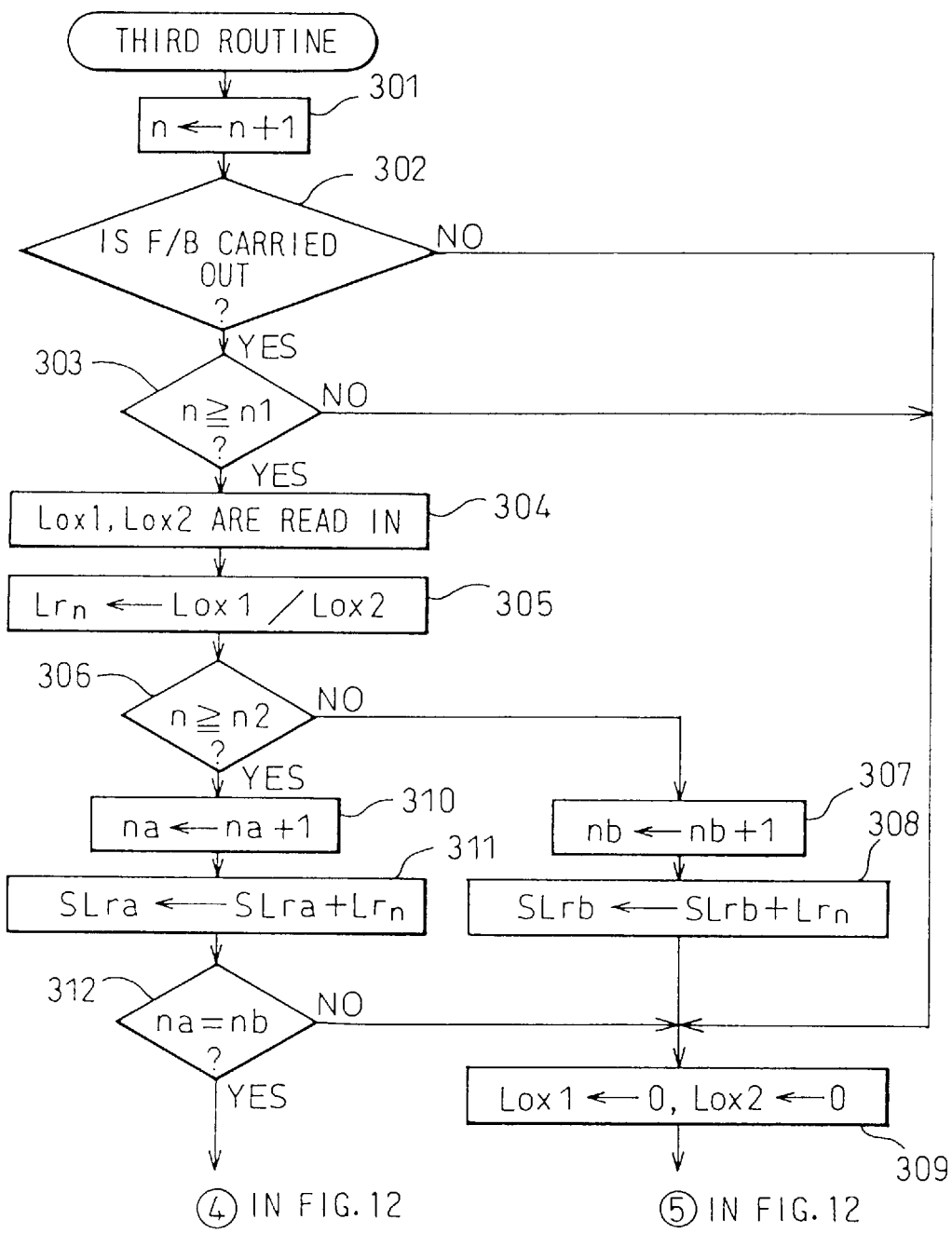
FIG. 11 is a part of a third routine for determining the abnormal degree of deterioration of a catalyst.
Figure 12:
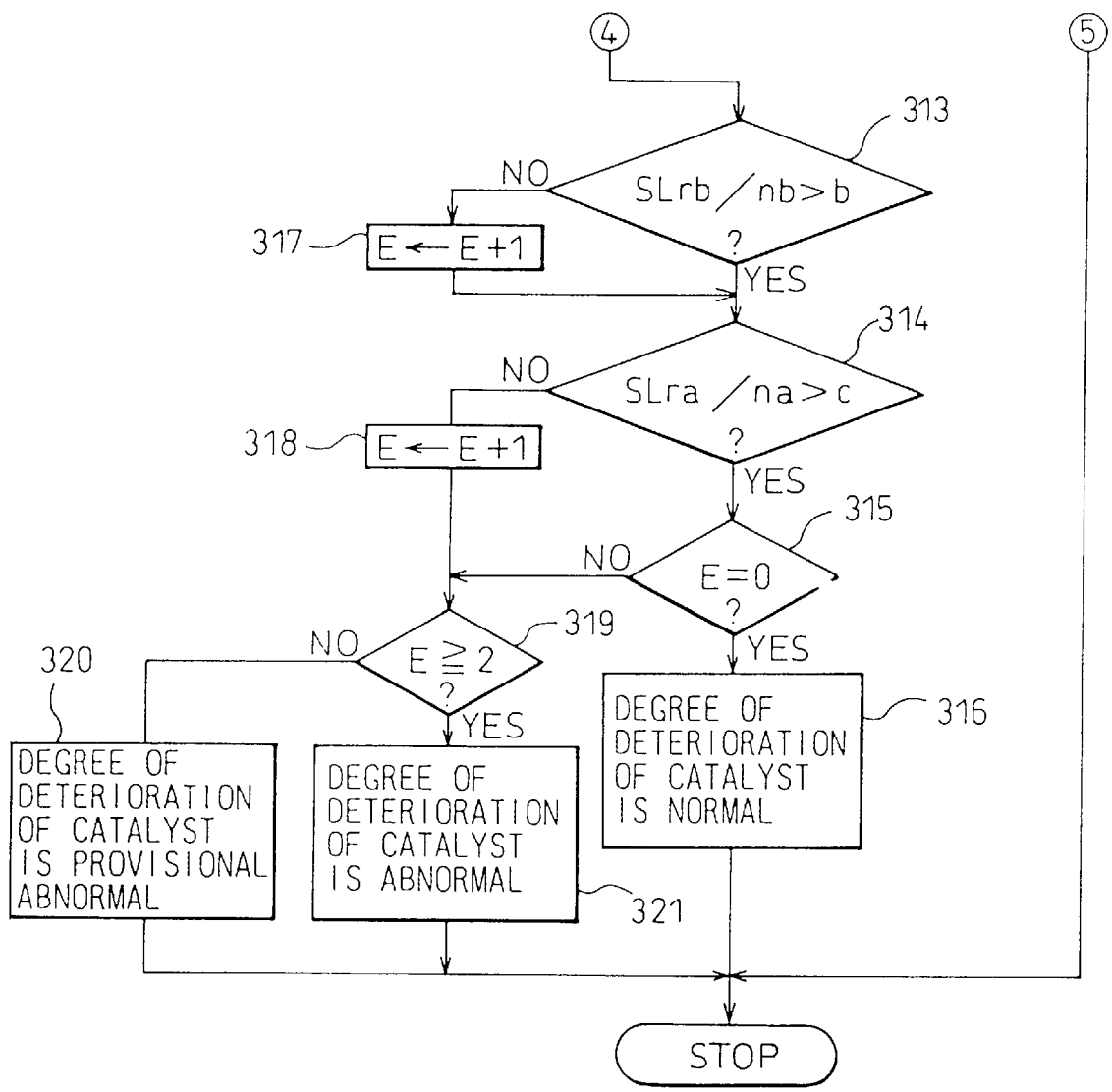
FIG. 12 is the remainder of the third routine.

FIGS. 11 and 12 show a third routine for determining the abnormal degree of deterioration of the catalyst. The differences between the second routine and the third routine only are explained as follows. In this routine, at step 312, it is determined if the count value [na] is equal to the count value [nb]. When the result is affirmative, the routine goes to step 313, and a first average value [SLrb/nb] is calculated such that the integration value [SLrb] in an incomplete activation condition of the catalyst is divided by the count value [nb], and it is determined if the first average value is larger than a threshold [b] thereof which corresponds to the abnormal degree of deterioration of the catalyst in an incomplete activation condition thereof.

When the result is affirmative, the routine goes to step 314 and a second average value [SLra/na] is calculated such that the integration value [SLra] in complete activation condition of the catalyst is divided by the count value [na], and it is determined if the second average value is larger than a threshold [c] thereof which corresponds to the abnormal degree of deterioration of the catalyst in a complete activation condition thereof. When the result is affirmative, the routine goes to step 315 and it is determined if a determination flag [E] is [0], which flag is explained in detail as follows. The determination flag [E] is set to [0] when the catalyst is new. When both of the results at steps 313, 314 are affirmative, the determination flag [E] is kept [0] so that the result at step 315 is affirmative. The routine goes to step 316 and it is determined that the degree of deterioration of the catalyst is normal.

On the other hand, when the result at step 313 is negative, i.e., when the first average value [SLrb/nb] is smaller than the threshold [b], the degree of deterioration of the catalyst may be abnormal so that the routine goes to step 317 and the determination flag [E] is increased by [1]. Thereafter, the routine goes to step 314. If the result at step 314 is affirmative, the routine goes to step 315. The result at step 315 is negative and the routine goes to step 319.

At step 319, it is determined if the determination flag [E] is equal to or larger than [2]. Now, the determination flag [E] is [1] so that the result is negative and the routine goes to step 320 and thus it is determined that the degree of deterioration of the catalyst is provisional abnormal. Conversely, in the case that the degree of deterioration of the catalyst may be abnormal in a complete activation condition thereof and is normal in an incomplete activation condition thereof, the routine goes from step 313 through steps 314, 318, 319 to step 320. It is also determined that the degree of deterioration of the catalyst is provisionally abnormal.

On the other hand, when both of the results at steps 313 and 314 are negative, i.e., when the degree of deterioration of the catalyst may be abnormal in incomplete and complete activation conditions, the determination flag [E] is increased by [1] at steps 317, 318 so that the result at step 319 is affirmative and the routine goes to step 321 and thus it is determined that the degree of deterioration of the catalyst is abnormal.

In the next process of the routine, if the degree of deterioration of the catalyst is still provisionally abnormal, the determination flag [E] is also increased by [1] at step 317 or 318 so that the result at step 319 is affirmative and thus it is determined that the degree of deterioration of the catalyst is abnormal.

Thus, according to the present routine, when the purification ability of the catalyst detected in complete activation condition thereof is less than the threshold thereof, and the purification ability of the catalyst detected in an incomplete activation condition thereof is less than the threshold thereof, it is sure that the catalyst deteriorates excessively so that it is determined that the degree of deterioration of the catalyst is abnormal so that the driver is urged to exchange the catalyst for a new one. When only one of the purification abilities of the catalyst detected in complete and incomplete activation conditions thereof is less than the threshold thereof, the actual purification ability in a complete or an incomplete activation condition may drop excessively or the detected purification ability may be accurate so that it is determined that the degree of deterioration of the catalyst is provisionally abnormal. It is unusual that only one of the purification abilities in a complete and an incomplete activation conditions drops excessively. However, when this is repeated, it is sure that only one of the purification abilities drops excessively so that it is determined that degree of deterioration of the catalyst is abnormal.

In particular, the purification ability detected in an incomplete activation condition can not be accurate since it is unstable. However, in this case, the present routine is not mistaken that degree of deterioration of the catalyst is abnormal.

As the method of detecting the purification ability of the catalyst, usual other methods, for example, a comparison between an inversion period (from lean side to rich side, or from rich side to lean side) of output of the first air-fuel ratio sensor and of the second air-fuel ratio sensor, or the comparison between a time integration value of output of the first air-fuel ratio sensor and of the second air-fuel ratio sensor, can be utilized.

Figure 14:
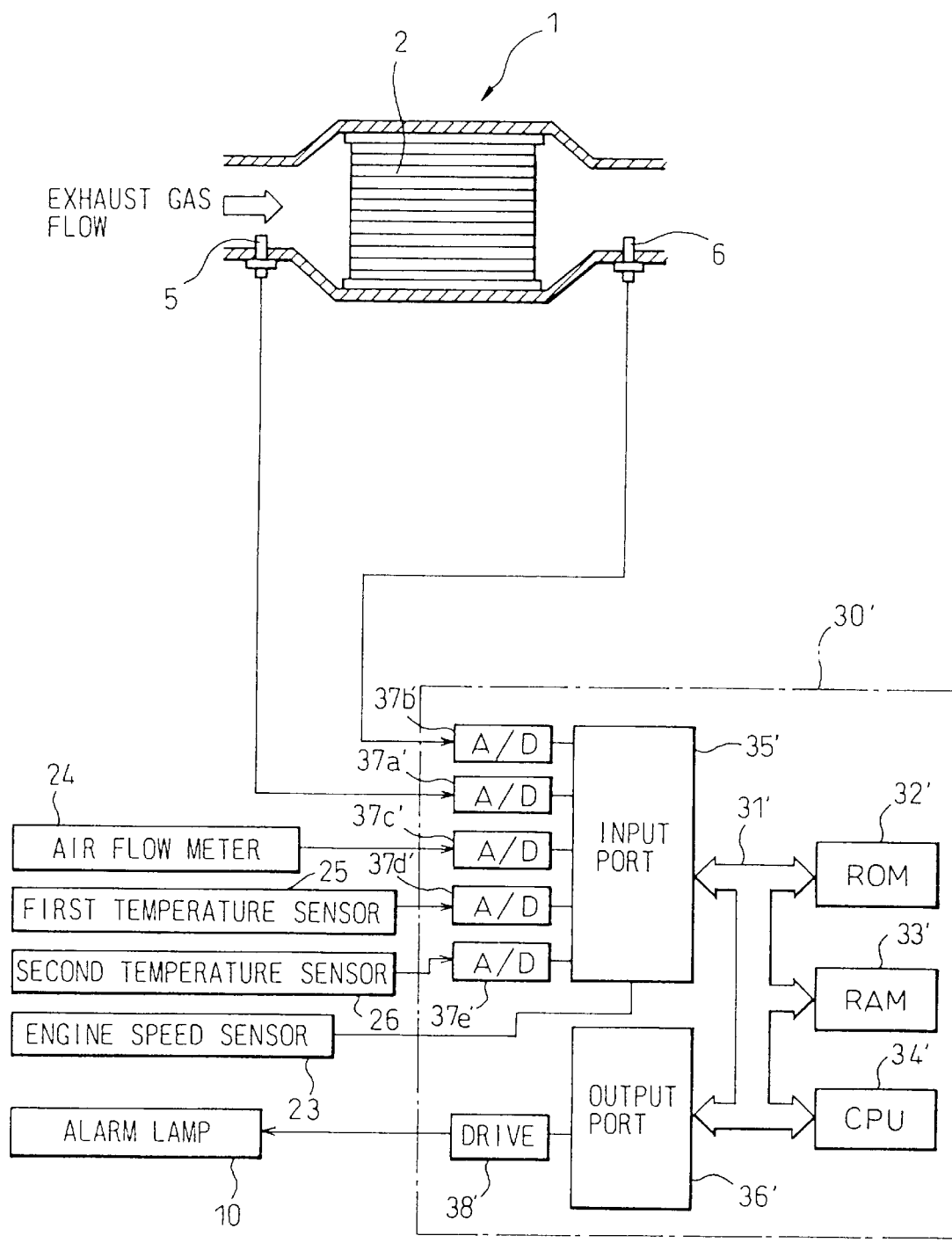
FIG. 14 is a sectional view of a part of an internal combustion engine exhaust system with another device for determining the abnormal degree of deterioration of a catalyst.
Figure 15:
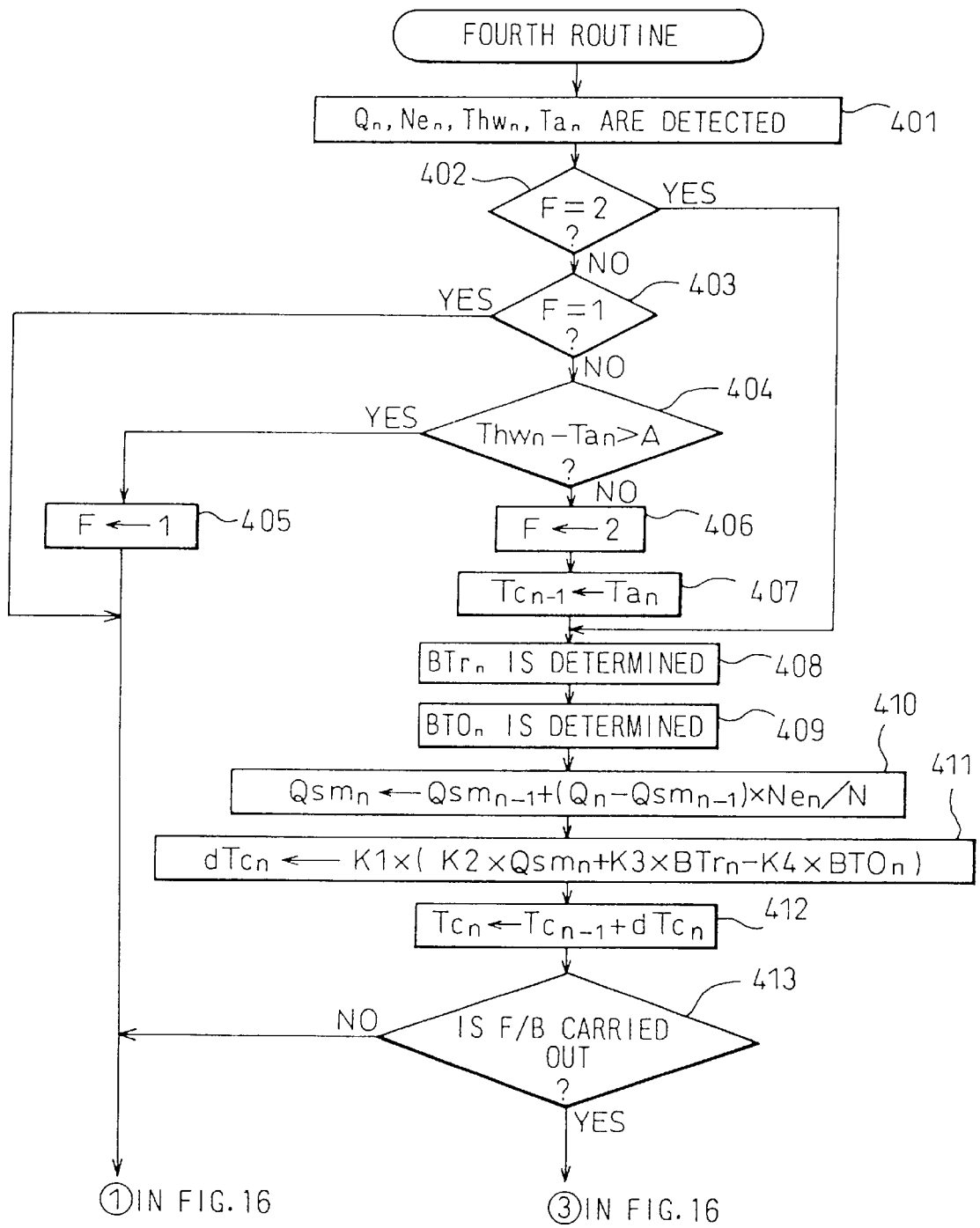
FIG. 15 is a part of a fourth routine for determining the abnormal degree of deterioration of a catalyst.
Figure 16:
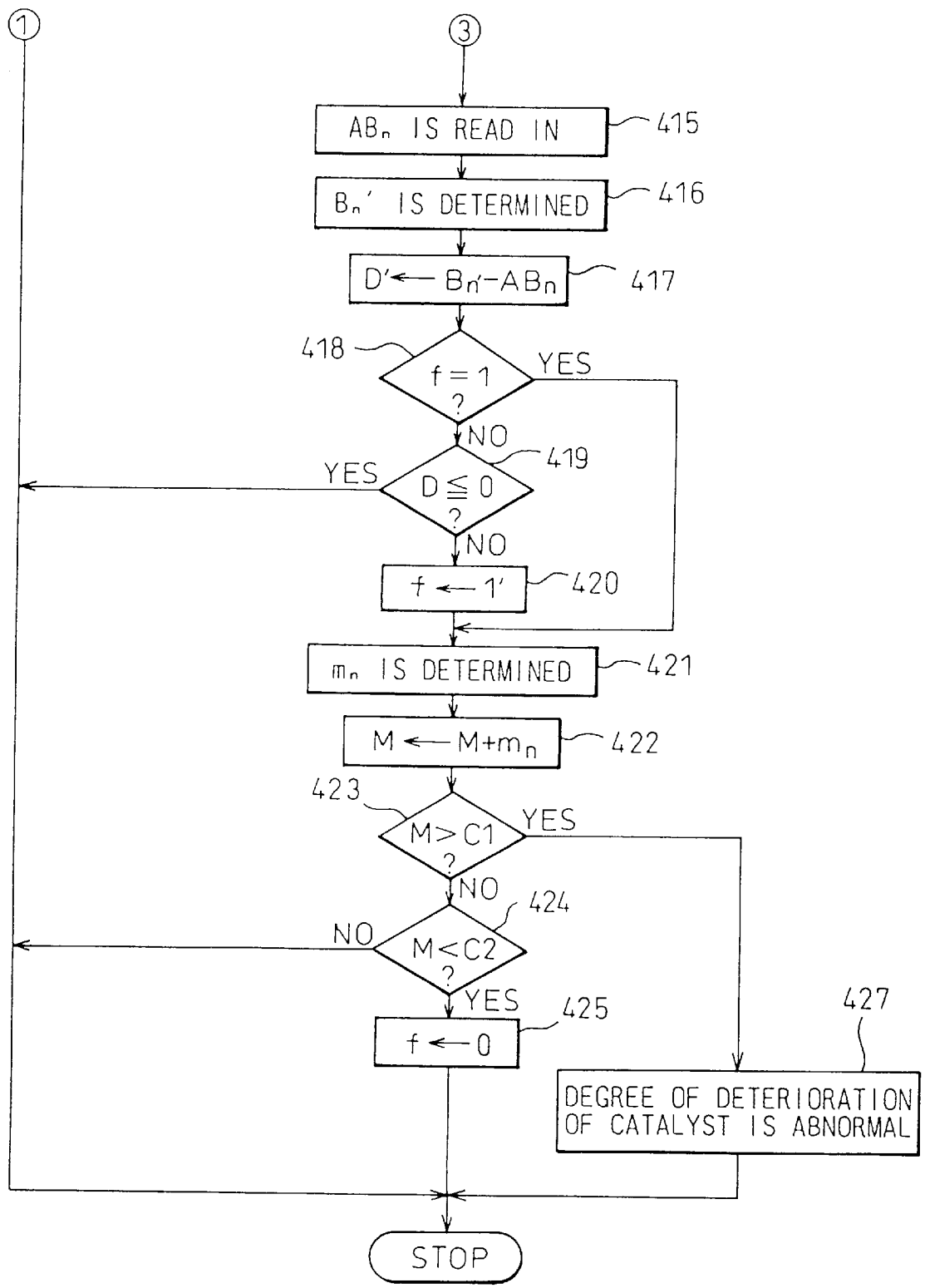
FIG. 16 is the remainder of the fourth routine.

In the above-mentioned three routines, as a current purification ability of the catalyst, a current $O_2$ storage ability thereof is utilized. However, a current purification ability of the catalyst can be directly detected such that at least one HC sensor detects HC concentration in the exhaust gas. FIG. 14 is a sectional view of a part of an internal combustion engine exhaust system with a device for determining the abnormal degree of deterioration of a catalyst, using two HC sensors. The difference between FIG. 14 and FIG. 1 is to have a first HC sensor 5 and a second HC sensor 6, instead of the first air-fuel ratio sensor 3 and the second air-fuel ratio sensor 4. The first and second HC sensors 5, 6 produce an output voltage which is proportional to HC concentration in the exhaust gas. The device 10' determines if the degree of deterioration of the catalyst is abnormal, according to a fourth routine shown in FIGS. 15 and 16.

The differences between the present routine and the above-mentioned first routine only are explained as follows. In this routine, when the air-fuel ratio feed-back control [F/B] is carried out after the current temperature of the catalyst [$Tc_n$] is calculated at step 412, the routine goes to step 415 and a current purification ability of the catalyst [$AB_n$] is read in. The current purification ability [$AB_n$] is calculated in a routine shown in FIG. 17. Thereafter, the routine goes to step 416 and a threshold [$B_n'$] of the purification ability which corresponds the abnormal degree of deterioration of the catalyst in the current temperature of the catalyst is determined by a map which is similar to the map shown in FIG. 7. Next, at step 417, a difference [D'] between the threshold [$B_n'$] and the purification ability [$AB_n$] is calculated and the process after step 418 as same as the process after step 118 in the first routine is carried out. In the case that the degree of deterioration of the catalyst may be abnormal, when the integration value of each appraisal value determined on the basis of each difference [D'] in complete and incomplete activation conditions of the catalyst exceeds a predetermined value, it is determined that the degree of deterioration of the catalyst is abnormal.

Figure 17:
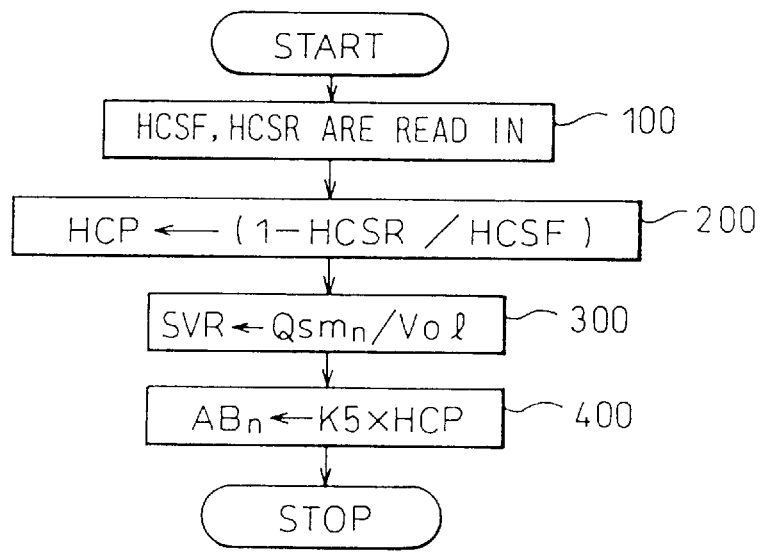
FIG. 17 is a routine for calculating the purification ability of the catalyst.

The routine shown in FIG. 17 is repeated at every predetermined period as same as the repeating period of the fourth routine. The integration of value on the basis of output of the sensor is not required so that the reset corresponding to steps 128, 129 in the first routine is eliminated. In this routine, at step 100, an output of the first HC sensor 5, i.e., HC concentration in exhaust gas flowing into the catalytic carrier 2 [HCSF], and an output of the second HC sensor 6, i.e., HC concentration in exhaust gas flowing out from the catalytic carrier 2 [HCSR], are read in. Next, at step 200, a rate of purification of hydrocarbon [HCP] is calculated by an expression (7).

$$HCP = (1 - HCSR/HCSF) \qquad (7)$$

Figure 18:
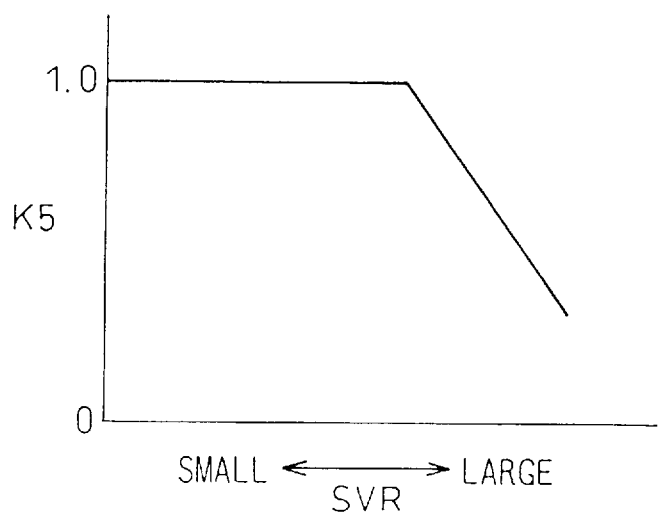
FIG. 18 is a map for determining a coefficient used in the routine of FIG. 17.

The rate of purification of hydrocarbon [HCP] varies in accordance with not only the purification ability of the catalyst but also a catalytic carrier space speed (a ratio of an amount of exhaust gas to a catalytic carrier capacity). Because, in case that the catalytic carrier space speed is large, if the purification ability of the catalyst is high, an amount of hydrocarbon blowing through the catalytic carrier without being purified becomes large. Accordingly, at step 300, a current catalytic carrier space speed [SVR] is calculated such that a current amount of intake air [$QSm_n$] calculated at step 410, as a current amount of exhaust gas, is divided by the catalytic carrier capacity [Vol]. Next, at step 400, a fifth coefficient [K5] is determined by a map shown in FIG. 18, on the basis of the current catalytic carrier space speed [SVR], and a current purification ability of the catalyst [$AB_n$] is calculated such that the rate of purification of hydrocarbon is multiplied by the fifth coefficient [K5]. In the map shown in FIG. 18, the fifth coefficient is set such that the rate of purification of hydrocarbon drops when the catalytic carrier space speed [SVR] is larger than a predetermined value.

Figure 13:
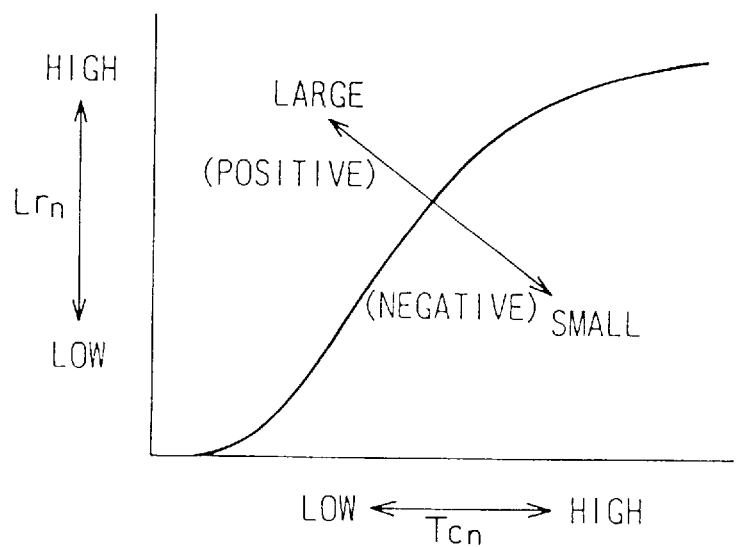
FIG. 13 is a map for directly determining an appraisal value.

In the fourth routine, an appraisal value can be directly determined by the map shown in FIG. 13, instead of steps 416, 417, as explained in the first routine.

Figure 19:
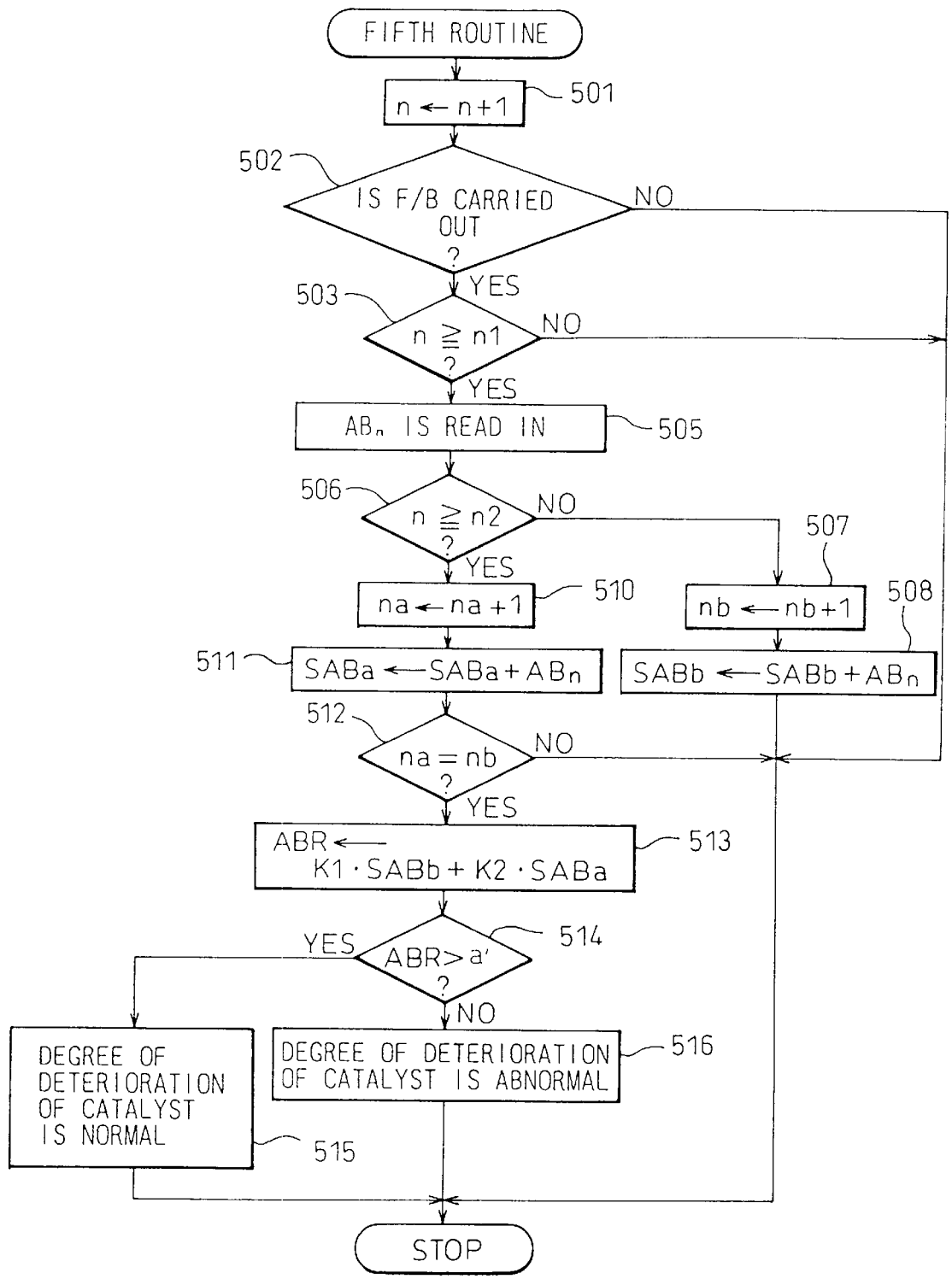
FIG. 19 is a fifth routine for determining the abnormal degree of deterioration of a catalyst.

The device 10' can determine if the degree of deterioration of the catalyst is abnormal according to a fifth routine shown in FIG. 19, instead of the fourth routine. The differences between the above-mentioned second routine and the fifth routine only are explained as follows. In the fifth routine, at step 505, a current purification ability of the catalyst [$AB_n$] is read in from the routine shown in FIG. 17, the as same as in fourth routine. The purification ability is utilized instead of the purification ability on the basis of the $O_2$ storage ability of the catalyst. Thereafter, at step 508, an integration value [SABb] of the purification ability in an incomplete activation condition thereof is calculated. At step 511, an integration value [SABa] of the purification ability in a complete activation condition thereof is calculated. At step 513, the integration value [SABb] is multiplied by the first coefficient [k1], the integration value [SABa] is multiplied by the second coefficient [k2], and the sum of these multiplied values is made an overall purification ability of the catalyst [ABR], as explained in the second routine. At step 514, when the overall purification ability [ABR] exceeds a threshold [a'] thereof, it is determined that the degree of deterioration of the catalyst is abnormal.

Figure 20:
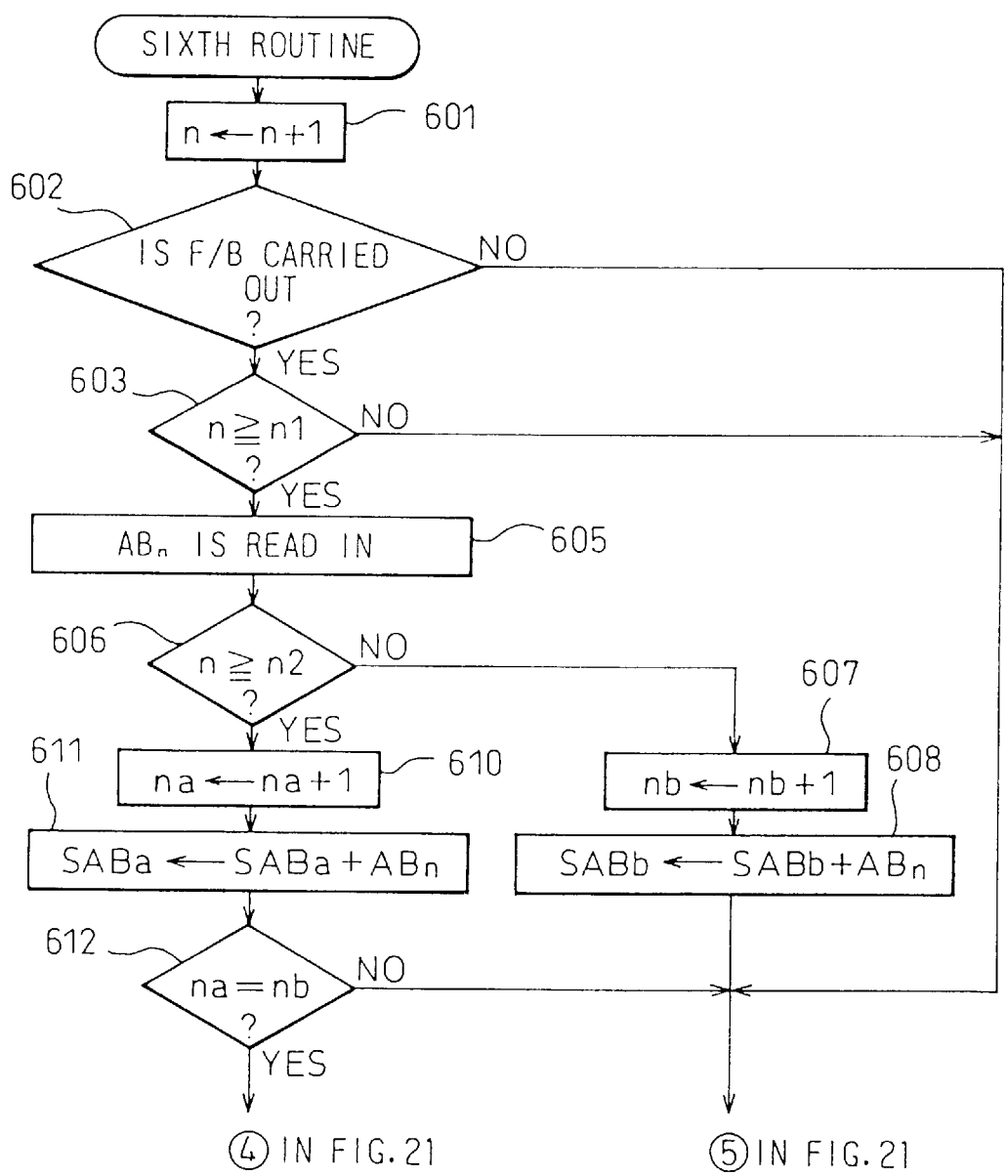
FIG. 20 is a part of a sixth routine for determining the abnormal degree of deterioration of a catalyst.
Figure 21:
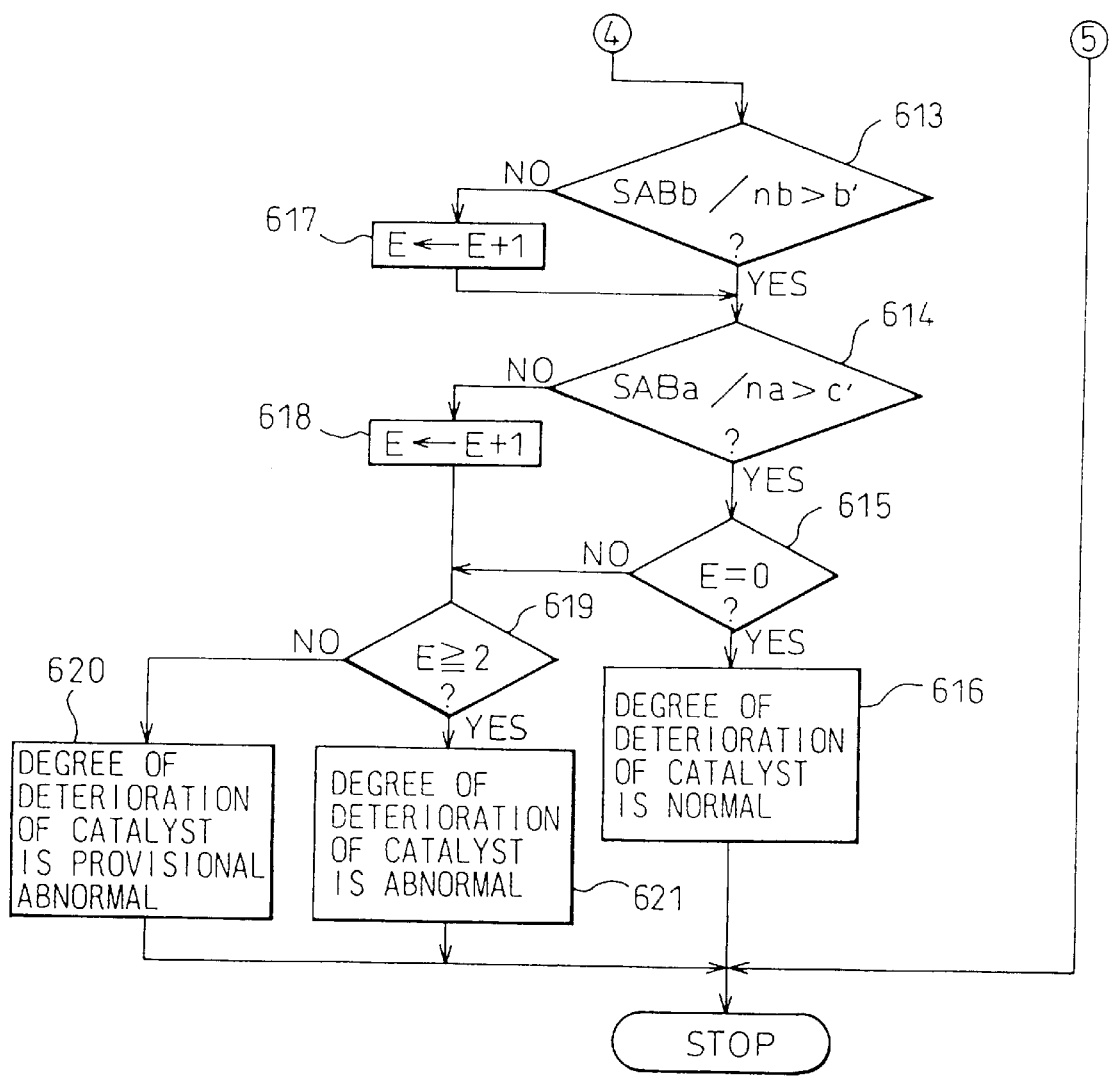
FIG. 21 is the remainder of the sixth routine.

The device 10' can determine if the degree of deterioration of the catalyst is abnormal according to a sixth routine shown in FIGS. 20 and 21, instead of the fourth routine. The differences between the above-mentioned third routine and the sixth routine only are explained as follows. In the sixth routine, at step 605, a current purification ability of the catalyst [$AB_n$] is read in from the routine shown in FIG. 17, as same as in fourth routine. The purification ability is utilized instead of the purification ability on the basis of the $O_2$ storage ability of the catalyst. Thereafter, at step 613, it is determined if a first average value [SABb/nb] in an incomplete activation condition of the catalyst is larger than a threshold [b'] thereof. At step 614, it is determined if a first average value [SABa/na] in a complete activation condition of the catalyst is larger than a threshold [c'] thereof. When both of these results are negative, it is determined that degree of deterioration of the catalyst is abnormal at step 621. When only one of these results is negative, it is determined that the degree of deterioration of the catalyst is provisionally abnormal at step 620. When this is repeated, it is determined that the degree of deterioration of the catalyst is abnormal at step 621.

In the fourth, fifth, and sixth routines, the purification ability of the catalyst is directly grasped by the HC sensors, instead of indirectly grasping it by the air-fuel ratio sensors. Therefore, the obtained purification ability is more accurate so that the determination of the abnormal degree of deterioration of the catalyst can be made more accurate. Moreover, these routines can determine if the degree of deterioration of the catalyst is abnormal in the catalytic converter which does not have the $O_2$ storage ability.

Figure 22:
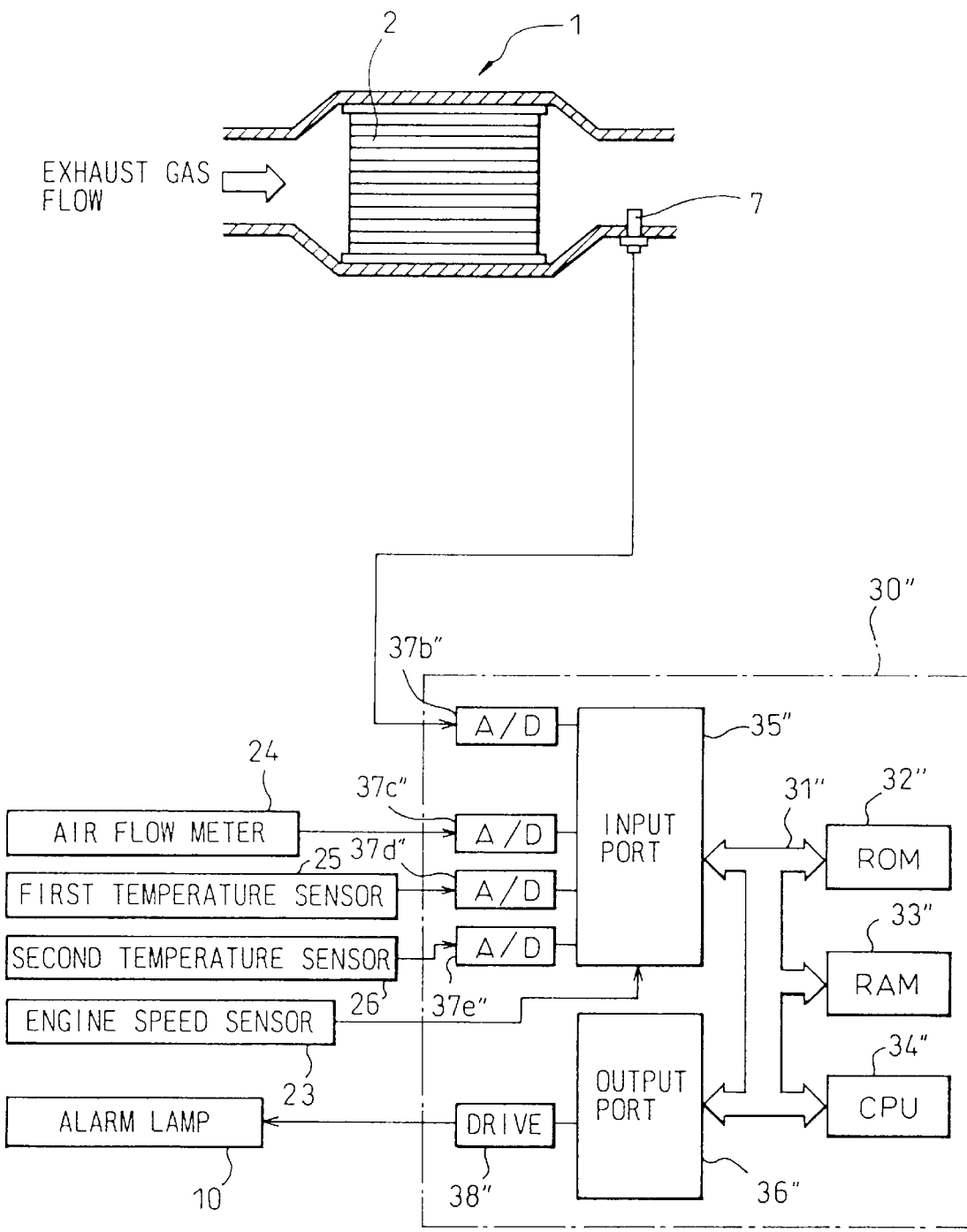
FIG. 22 is a sectional view of a part of an internal combustion engine exhaust system with a further another device for determining the abnormal degree of deterioration of a catalyst.
Figure 23:
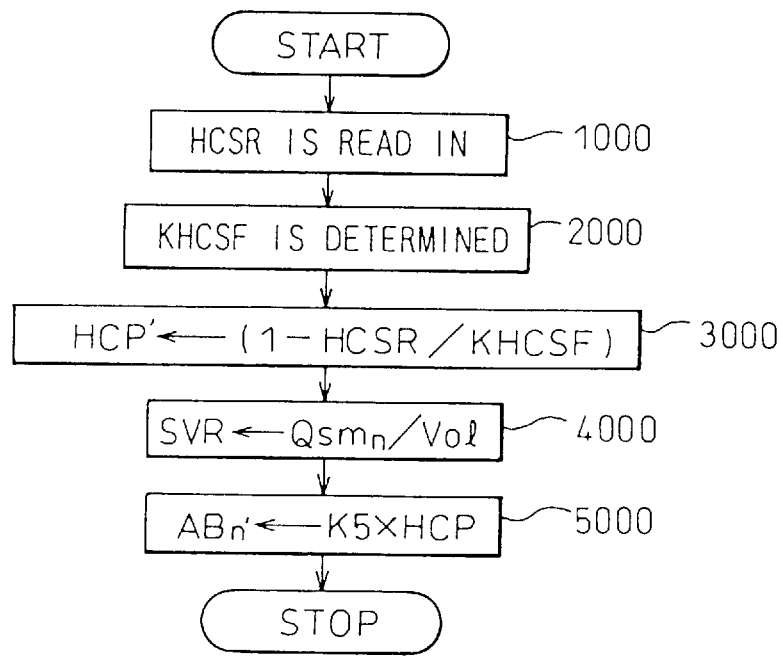
FIG. 23 is another routine for calculating the purification ability of the catalyst.

FIG. 22 is a sectional view of a part of an internal combustion engine exhaust system with a device for determining the abnormal degree of deterioration of a catalyst, using only one HC sensor. The difference between FIG. 22 and FIG. 14 is to have a HC sensor 7 downstream of the catalytic carrier 2, instead of the first HC sensor 5 and the second HC sensor 6. The device 10" calculates the purification ability of the catalyst according to a routine shown in FIG. 23, to determine if the degree of deterioration of the catalyst is abnormal. The routine would be explained as follows.

Figure 24:
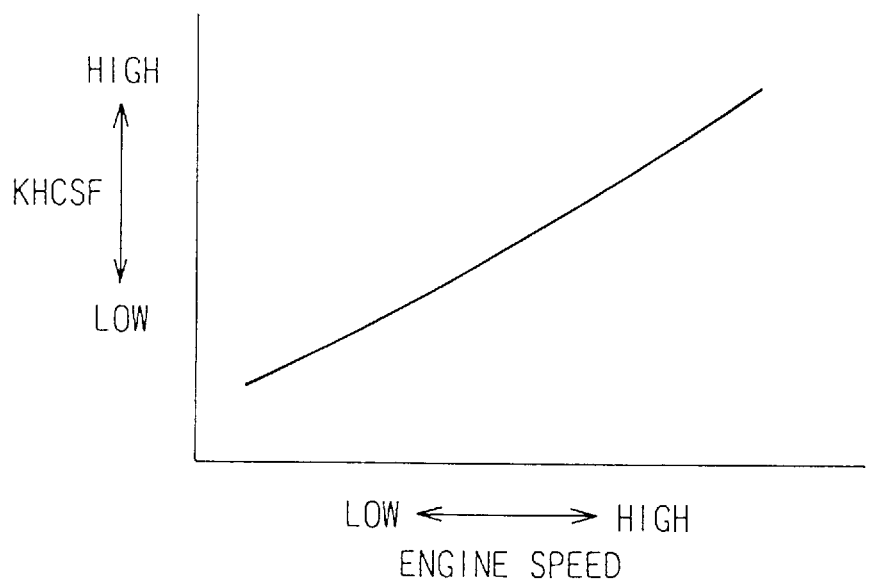
FIG. 24 is a map for determining HC concentration used in the routine of FIG. 23.

First, at step 1000, an output of the HC sensor 7, i.e., the HC concentration in the exhaust gas flowing out from the catalytic carrier 2 [HCSR] is read in. Next, at step 2000, the HC concentration in the exhaust gas flowing into the catalytic carrier 2 [KHCSF] is determined by a map shown in FIG. 24, on the basis of the current engine speed. At step 3000, a rate of purification of hydrocarbon [HCP'] is calculated by an expression (8).

$$HCP'=(1-HCSR/KHCSF) \tag{8}$$

Next, at step 4000, a current catalytic carrier space speed [SVR] is calculated as same as in the routine shown in FIG. 17. At step 5000, a current purification ability of the catalyst [$AB_n$'] is calculated such that the rate of purification of hydrocarbon is multiplied by the fifth coefficient [K5]. The calculated purification ability of the catalyst can be used in the fourth, fifth, or sixth routine. Thus, it can be determined if the degree of deterioration of the catalyst is abnormal by only one HC sensor.

In the second, third, fifth, and sixth routines, each purification ability of the catalyst in the complete and the incomplete activation conditions thereof is calculated on the basis of many detected values. However, this does not limit the present invention. If only one detected value in an incomplete activation condition of the catalyst is used as the purification ability thereof, and only one detected value in a complete activation condition of the catalyst is used as the purification ability thereof, the reliability of determination of the abnormal degree of deterioration of the catalyst becomes higher than the prior art.

In the first and fourth routines, the current temperature of the catalyst is calculated. Of course, a measured value of the catalyst temperature may be used, in stead of the calculated value.

In the first, second, and third routines, the current $O_2$ storage ability is calculated as the current purification ability. In case that the catalytic converter space speed is large, and if the $O_2$ storage ability of the catalyst is high, an amount of oxygen blowing through the catalytic carrier without being stored become large. Accordingly, if in the calculation of the $O_2$ storage ability, a current catalytic carrier space speed is taken account of, the grasped $O_2$ storage ability of the catalyst, i.e., the grasped purification ability thereof becomes more accurate.

Although the invention has been described with reference to specific embodiments thereof, it should be apparent that numerous modifications can be made thereto by those skilled in the art, without departing from the basic concept and scope of the invention.

We claim:

1. A device for determining the abnormal degree of deterioration of catalyst of a catalytic converter arranged in an internal combustion engine exhaust system, comprising:

first purification ability grasping means for grasping a first purification ability of said catalyst in complete activation condition of said catalyst;

second purification ability grasping means for grasping a second purification ability of said catalyst in incomplete activation condition of said catalyst;

overall purification ability calculating means for calculating an overall purification ability of said catalyst such that said first purification ability given a first weight is added to said second purification ability given a second weight which is less than said first weight; and abnormality determining means for determining if the degree of deterioration of said catalyst is abnormal by the comparison between said overall purification ability and a predetermined threshold thereof.

2. A device according to claim 1, wherein said first purification ability grasping means grasps said first purification ability, on the basis of many purification abilities grasped in a complete activation condition of said catalyst.

3. A device according to claim 1, wherein said second purification ability grasping means grasps said second purification ability, on the basis of many purification abilities grasped in an incomplete activation condition of said catalyst.

4. A device according to claim 1, wherein said first and second purification ability grasping means have a detecting means for detecting an $O_2$ storage ability of said catalyst, and grasp said first and second purification abilities of said catalyst on the basis of said $O_2$ storage ability.

5. A device according to claim 1, wherein said first and second purification ability grasping means have a detecting means for detecting a HC purification ability of said catalyst, and grasp said first and second purification abilities of said catalyst on the basis of said HC purification ability.

* * * * *